3,255,134
FATTY ACID ANHYDRIDES AS SLIP AND ANTI-BLOCKING AGENTS FOR POLYOLEFINS
Richard Rowe, Altrincham, England, assignor to Victor Wolf Limited, Clayton, England, a British company
No Drawing. Filed Mar. 20, 1962, Ser. No. 181,151
Claims priority, application Great Britain, Mar. 24, 1961, 10,850/61
9 Claims. (Cl. 260—23)

This invention relates to coatings, films or sheets, and fibres of or containing the so-called "plastics" and is particularly concerned with slip agents and anti-blocking agents for use in films, in coatings for cellophane, cellulose and metals, and in fibres, such as those films, coatings and fibres composed of polyvinyl chloride, polyethylene, polyvinylidene chloride, cellulose acetate, alkyd resins or polyamide resins.

In the processing of "plastic" sheets such as those composed of polyvinyl chloride or polyethylene on roller mills it is desirable to reduce the coefficient of friction between the "plastic" films and the rollers and also to reduce the stickiness or blocking tendency of the surface of the "plastic" films. Further, when films of polyvinyl chloride, polyethylene or other "plastics" are piled under load there is a tendency for the individual films to adhere to one another at their contact surface. This phenomenon is known as blocking of the "plastic" films.

The reduction of the coefficient of friction between pairs of "plastic" films and the reduction of the blocking tendency between such films is also advantageous in manual or machine wrapping processes using these films as wrapping materials.

Likewise when "plastic" coatings such as polyvinylidene chloride coatings are applied to paper or cellophane it is advantageous to minimise the friction and blocking between pairs of coated surfaces in manual machine wrapping operations and in piles of surface-coated materials under load. It is also advantageous to increase the slip and decrease the blocking tendency of the surfaces of "plastic" coatings such as printing inks.

Additives to the "plastic" films which reduce the coefficient of friction are known as slip agents, whilst additives which reduce the adhesion or blocking tendency are known as anti-blocking agents.

According to the present invention anhydrides of carboxylic acids, particularly mono-carboxylic acids, are used as slip agents and anti-blocking agents for polyvinyl chloride, polyethylene, polyvinylidene chloride, cellulose acetate, alkyd resin, polyamide resins and the like "plastic" materials.

The invention includes "plastic" material containing the anhydrides and processes for incorporating the anhydrides in, or applying them to, the "plastic" materials.

The anhydride must be satisfactorily compatible with the "plastic" material. The preferred anhydrides are those having melting points in the range 50°–80° C. although the invention is not limited thereto.

Palmitic acid anhydride is a suitable carboxylic acid anhydride but e.g. stearic acid anhydride can also be used. Mixtures of anhydrides, such as a mixture of stearic acid anhydride with lauric acid anhydride or a mixture of palmitic acid anhydride with myristic acid anhydride, with melting points which lie within the indicated range can also be employed. Finally, unsymmetrical anhydrides made from mixtures of fatty acids such as a mixture of stearic and palmitic acids, called "commercial stearic acid" may also be used.

The anhydride may be incorporated in the "plastic" material prior to curing the material. For example, it may be incorporated in polyvinyl chloride before milling into sheet form by admixing the polyvinyl chloride with the carboxylic acid anhydride and also with the plasticiser and stabiliser. The carboxylic acid anhydride can be applied either in solid form or in solution, for example in a mixture of equal parts of methyl-ethyl-ketone and toluene.

The mixture is then processed in the sheet form using a standard type of roller mill.

The invention is illustrated by the following examples.

A mixture designated "A," prepared according to the following composition:

| | Parts by weight |
|---|---|
| Polyvinyl chloride (as sold under the trade name Geon 101) | 100 |
| Lead carbonate paste | 2 |
| Tritolyl phosphate | 70 | was processed on a two roll mill into sheets 0.012" thick.

Likewise a mixture designated "B" prepared according to the following composition:

| | Parts by weight |
|---|---|
| Polyvinyl chloride (as sold under the trade name Geon 101) | 100 |
| Lead carbonate paste | 2 |
| Tritolyl phosphate | 70 |
| Palmitic acid anhydride | 2 | was processed on a two roll mill into sheets 0.012" thick.

The sheets prepared from the above two mixtures were separately conditioned in piles under a load of 12 lbs. in an oven at 100° C. for 18 hours. The sheets were piled during the conditioning in such manner that pairs of sheets were in horizontal contact, each pair being separated from the next pair above or below it in the pile by sheets of paper. After the conditioning process the load necessary to peel apart the pairs of sheets was determined. For sheets based on mix. "A" a load of 797 gms. was required to overcome blocking, whilst for sheets based on mix. "B" a load of only 378 gms. was required to overcome blocking.

When sheets 0.012" thick of polyvinyl chloride prepared from the following mixture designated "C,"

| | Parts by weight |
|---|---|
| Polyvinyl chloride (Geon 101) | 100 |
| Cadmium stearate paste | 1 |
| Barium stearate paste | 1 |
| Tritolyl phosphate | 50 | were tested for friction between pairs of these sheets under an applied load of 105 gms. the coefficient of dynamic friction was found to be 0.295.

When on the other hand, sheets 0.012" thick of polyvinyl chloride prepared from the following mixture designated "D,"

| | Parts by weight |
|---|---|
| Polyvinyl chloride (Geon 101) | 100 |
| Cadmium stearate paste | 1 |
| Barium stearate paste | 1 |
| Tritolyl phosphate | 50 |
| Palmitic acid anhydride | 1 | were tested for friction between pairs of these sheets under an applied load of 105 gms. the coefficient of dynamic friction was found to be only 0.223.

In general the amount of carboxylic acid anhydride used may be from one half to five parts by weight per hundred parts of the "plastic."

In place of the plasticisers and stabilisers mentioned above, other compatible plasticisers, for example di-octyl phthalate or iso-octyl sebacate, and stabilisers, for example barium or cadmium soaps can be employed.

I claim:
1. A material selected from the group consisting of polyvinyl chloride, polyethylene, polyvinylidene chloride, and cellulose acetate, said material having incorporated therein an anhydride of an aliphatic monocarboxylic acid containing chains of at least 12 carbon atoms as a slip agent and anti-blocking agent.

2. a material as claimed in claim 1 in which the carboxylic acid anhydride has a melting point in the range 50° to 80° C.

3. A material as claimed in claim 1 in which the carboxylic acid anhydride is a mixture of anhydrides, said mixture having a melting point in the range 50° to 80° C.

4. A material as claimed in claim 1 in which the carboxylic acid anhydride is an unsymmetrical carboxylic acid anhydride, said anhydride having a melting point in the range 50° to 80° C.

5. A material selected from the group consisting of polyvinyl chloride, polyethylene, polyvinylidene chloride and cellulose acetate, said material having incorporated therein an anhydride of an aliphatic monocarboxylic acid containing chains of from 12 to 18 carbon atoms as a slip agent and anti-blocking agent, said anhydride being incorporated in an amount of from one half to five parts by weight per hundred parts by weight of said material.

6. A polyvinyl chloride sheet having incorporated therein palmitic acid anhydride as a slip agent and anti-blocking agent, said anhydride being incorporated in an amount of from one half to five parts by weight per hundred parts by weight of said material.

7. A method of reducing friction and blocking in a material selected from the group consisting of polyvinyl chloride, polyethylene, polyvinylidene chloride and cellulose acetate, which comprises mixing the material with an anhydride of an aliphatic monocarboxylic acid containing chains of at least 12 carbon atoms and thereafter curing the material.

8. A method of reducing friction and blocking in a polyvinyl chloride sheet which comprises mixing the polyvinyl chloride with palmitic acid anhydride, a plasticiser and a stabiliser, milling the resultant mixture into sheets and thereafter curing said sheets, said anhydride being present in the resultant cured sheet in an amount of from one half to five parts by weight per hundred parts by weight of the sheet.

9. A method as claimed in claim 8 in which the palmitic acid anhydride is mixed with the polyvinyl chloride in the form of a solution in an organic solvent.

References Cited by the Examiner

UNITED STATES PATENTS

| 2,074,647 | 3/1937 | Hagedorn et al. | |
| 2,449,489 | 9/1948 | Larson | 260—94.9 |
| 2,455,910 | 12/1948 | Alderson | 260—94.9 |
| 2,556,045 | 6/1951 | Serdynsky et al. | |
| 2,613,156 | 10/1952 | McGaffin et al. | 106—178 |

FOREIGN PATENTS 610,138   10/1948   Great Britain.

LEON J. BERCOVITZ, *Primary Examiner.*

R. W. GRIFFIN, *Assistant Examiner.*